(12) United States Patent
Reynolds

(10) Patent No.: US 7,284,417 B2
(45) Date of Patent: Oct. 23, 2007

(54) TIRE MONITOR

(76) Inventor: Charles W. Reynolds, 86 Fawn Ridge La., Southport, CT (US) 06890

( * ) Notice: Subject to any disclaimer, the term of this patent is extended or adjusted under 35 U.S.C. 154(b) by 0 days.

(21) Appl. No.: 11/190,953

(22) Filed: Jul. 28, 2005

(65) Prior Publication Data

US 2007/0022805 A1 Feb. 1, 2007

(51) Int. Cl.
*B60C 23/02* (2006.01)
(52) U.S. Cl. .................................. 73/146.5
(58) Field of Classification Search ............... 73/146, 73/146.2, 146.3, 146.5, 146.8; 340/442
See application file for complete search history.

(56) References Cited

U.S. PATENT DOCUMENTS

| | | | | |
|---|---|---|---|---|
| 4,975,679 | A * | 12/1990 | Ballyns | 340/442 |
| 5,274,355 | A * | 12/1993 | Galan | 340/445 |
| 6,630,885 | B2 * | 10/2003 | Hardman et al. | 340/505 |
| 6,856,245 | B2 * | 2/2005 | Smith et al. | 340/442 |
| 6,903,653 | B2 * | 6/2005 | Hartmann et al. | 340/444 |
| 6,945,103 | B1 * | 9/2005 | Lee et al. | 73/146.5 |
| 7,171,849 | B2 * | 2/2007 | Kandler | 73/146.5 |
| 2003/0115945 | A1 * | 6/2003 | Tsujita | 73/146 |
| 2003/0201044 | A1 * | 10/2003 | Schick | 152/152.1 |
| 2004/0154389 | A1 * | 8/2004 | Okubo et al. | 73/146.4 |
| 2004/0212486 | A1 | 10/2004 | Dinello et al. | |
| 2005/0000298 | A1 | 1/2005 | Pfeifer et al. | |
| 2005/0007245 | A1 * | 1/2005 | Smith et al. | 340/442 |
| 2005/0046557 | A1 | 3/2005 | Katou | |
| 2005/0057346 | A1 | 3/2005 | Ogawa | |
| 2005/0081613 | A1 * | 4/2005 | Hattori | 73/146 |
| 2005/0081617 | A1 | 4/2005 | Sergio et al. | |
| 2005/0093687 | A1 | 5/2005 | Katou | |
| 2005/0103100 | A1 | 5/2005 | Miyoshi et al. | |
| 2005/0103413 | A1 | 5/2005 | Tozawa et al. | |
| 2005/0120801 | A1 | 6/2005 | Reuter et al. | |
| 2005/0132787 | A1 | 6/2005 | Benedict et al. | |
| 2005/0132790 | A1 | 6/2005 | Starinshak | |
| 2005/0133132 | A1 | 6/2005 | Girard et al. | |
| 2005/0146423 | A1 | 7/2005 | Hattori | |
| 2005/0150283 | A1 | 7/2005 | Shick et al. | |

\* cited by examiner

*Primary Examiner*—Andre J Allen
(74) *Attorney, Agent, or Firm*—Rothwell, Figg, Ernst & Manbeck

(57) ABSTRACT

A tire monitor for a vehicle includes a sensor disposed in the tire, a power supply connecting a first and second ends of the sensor, the power supply applying a predetermined effort across the first and second ends and causing a flow through the sensor, a meter disposed operably to the sensor to measure the flow and output a value substantially proportional to the flow, and a transmitter disposed operably to the meter to transmit the value to a vehicle information system, wherein the flow is reduced by a damage to the tire.

20 Claims, 2 Drawing Sheets

TIRE MONITOR

BACKGROUND OF THE INVENTION

1. Field of the Invention

This invention relates generally to the field of damage assessment in tires, and in particular to tire wear monitors.

2. Description of the Related Art

There is a need for tire monitors that can be used in applications requiring on-vehicle tire monitoring.

SUMMARY OF THE INVENTION

A primary object of the invention is to overcome the deficiencies of the related art described above by providing a tire monitor. The present invention achieves these objects and others by providing a tire monitor including a sensor.

In several aspects, the invention may provide a tire sensor. In particular, in one embodiment a tire monitor for a vehicle includes a sensor disposed in the tire, a power supply connecting a first and second ends of the sensor, the power supply applying a predetermined effort across the first and second ends and causing a flow through the sensor, a meter disposed operably to the sensor to measure the flow and output a value substantially proportional to the flow, and a transmitter disposed operably to the meter to transmit the value to a vehicle information system, wherein the flow is reduced by a damage to the tire.

The above and other features and advantages of the present invention, as well as the structure and operation of various embodiments of the present invention, are described in detail below with reference to the accompanying drawings.

BRIEF DESCRIPTION OF THE SEVERAL VIEWS OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
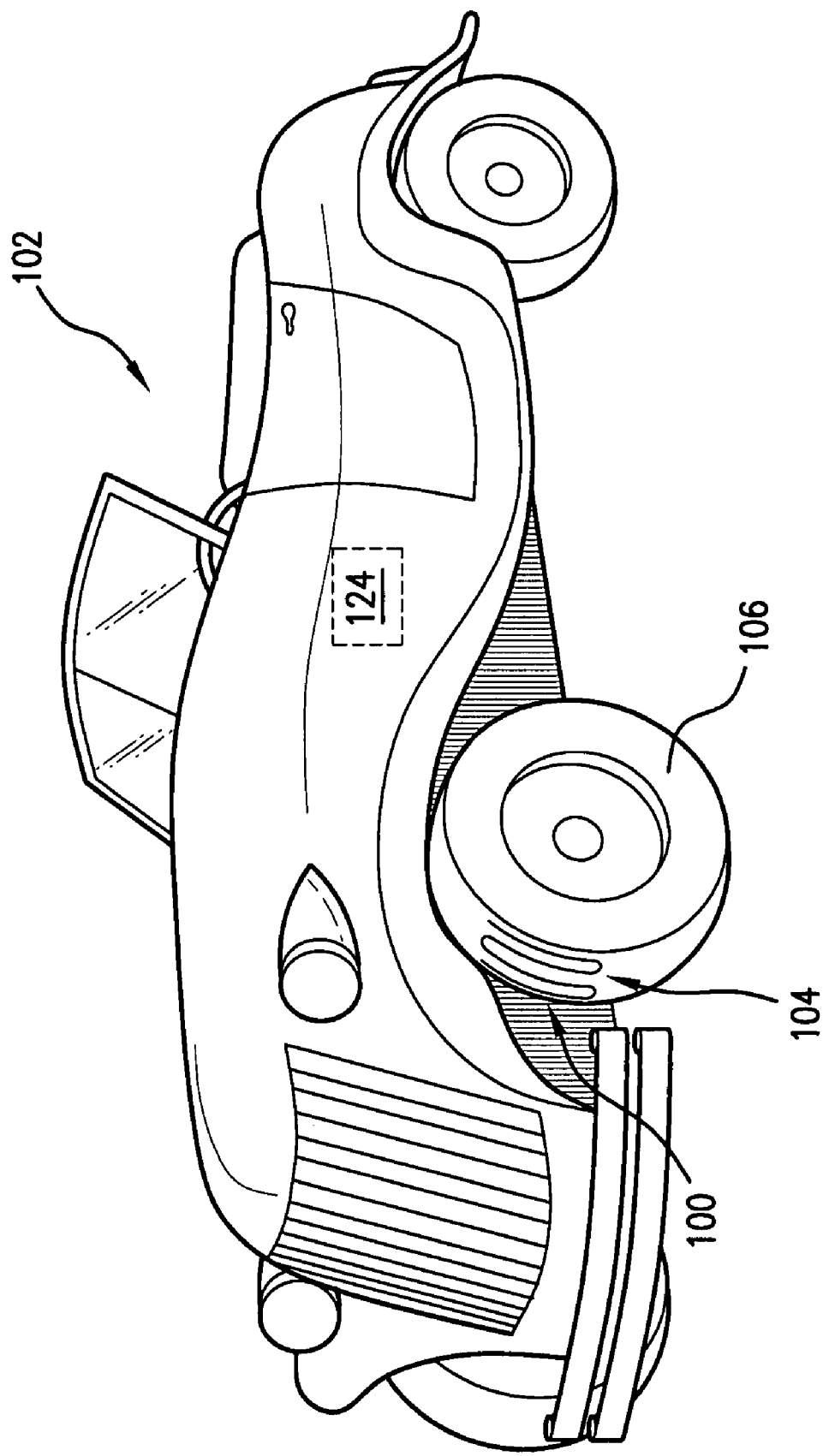
FIG. 1 is a schematic diagram of a tire monitoring system according to a first embodiment of the invention.
Figure 6:
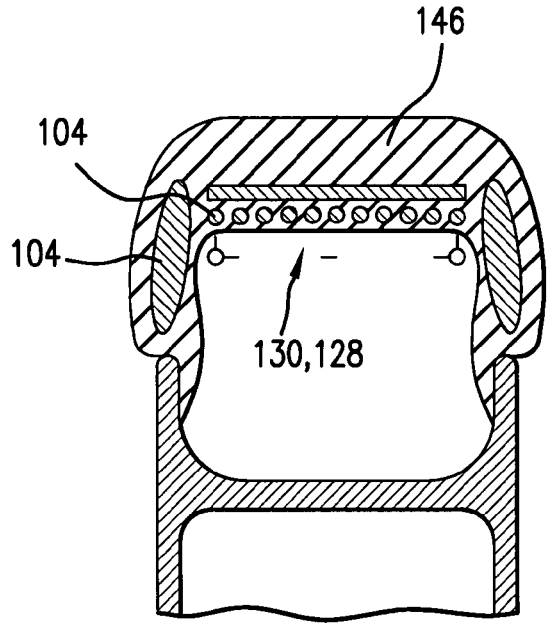
FIG. 6 is a section through the tire sensor shown in FIG. 2.
Figure 2:
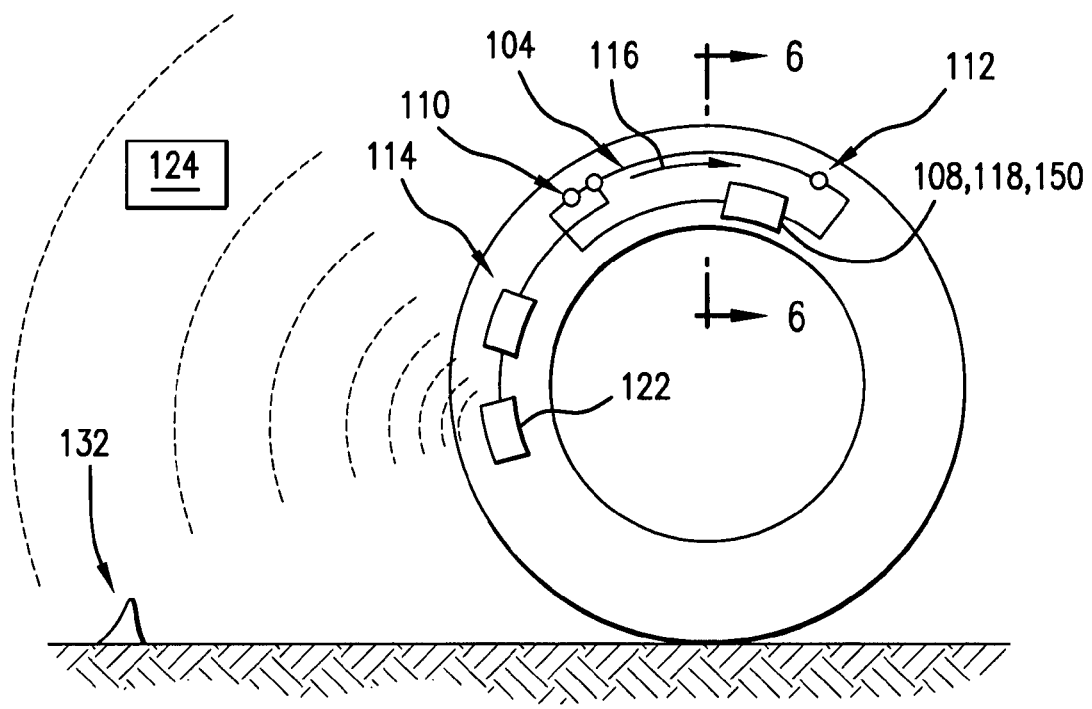
FIG. 2 is a schematic diagram of a tire sensor for use with the tire monitoring system shown in FIG. 1.

In FIGS. 1, 2, and 6 is shown a tire monitor 100 for a tire 106 mounted on a vehicle 102 according to a first embodiment of the invention. Referring now to FIG. 1, tire monitor 100 may include sensor 104 disposed in a tire 106. Sensor 104 may be a thermocouple, a conductor, a resistor, an inductor, a thermometer, an optical fiber, or a waveguide.

Figure 3:
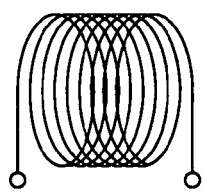
FIG. 3 is a first sensor pattern for use with an embodiment of the invention.

In one embodiment, shown in FIG. 3, sensor 104 is disposed circumferentially about an axis of rotation of tire 106. In this embodiment, sensor 104 may extend around the entire circumference of time 106. In other embodiments, sensor 106 may extend over only a portion of the circumference of tire 106.

Figure 4:
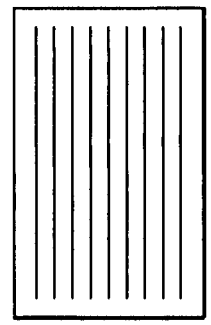
FIG. 4 is a second sensor pattern for use with an embodiment of the invention.
Figure 5:
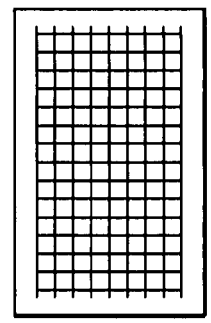
FIG. 5 is a third sensor pattern for use with an embodiment of the invention.

In another embodiment, shown in FIG. 6, sensor 104 is disposed in a sidewall of tire 106. In one embodiment, shown in FIG. 4 sensor 104 may be aligned with a direction of rotation of tire 106. In another embodiment, shown in FIG. 5, sensor 104 may be arranged both circumferentially and axially in a tread 146 of tire 106.

Referring now to FIG. 2, a power supply 108 connects a first and second ends 110, 112 of sensor 104. In several embodiments, power supply 108 may be a battery, an inductive pick-up, or a light source, such as a light emitting diode (LED). Power supply 108 may apply a predetermined effort 118 across first and second ends 110, 112. In one embodiment, predetermined effort 118 may be an electrical potential, such as a voltage. Predetermined effort 118 may cause a flow 116 through sensor 104. In several embodiments, flow 116 may be a current or a beam of light.

Referring now to FIG. 6, in one embodiment, flow 116 may be proportional to an area 130 of a cross-section 128 of sensor 104. Area 130, in turn, may be inversely proportional to an amount of damage to tire 106. In one embodiment, the damage experienced by tire 106 is proportional to a wear of a tread 146. In this embodiment, flow 116 is reduced when sensor 104 is subject to damage, reducing area 130. In another embodiment, the damage experienced by tire 106 is caused when tire 106 is pierced by an object 132, as shown in FIG. 2. If tire 106 wears down or is damaged by road debris, flow 116 may be reduced by the amount of damage to tire 106.

In another embodiment, a variable effort 150 may be inversely proportional to area 130 of a cross-section 128 of sensor 104. In this embodiment, variable effort 150 is increased when sensor 104 is subject to damage 126, reducing area 130.

Area 130 may, for example, be at a maximum when tire 106 is brand new. As tire 106 is placed in service and experiences degradation do to normal use, area 130 will become progressively smaller. The reduction of area 130 will be due primarily to a wear of a tread 146 of tire 106 to which area 130 may be proximate.

If, on the other hand, tire 106 experiences damage, such as damage due to debris cutting into a surface of tread 146, area 130 may be reduced at a greater rate, or severed completely. In either case flow 116 will be reduced substantially in proportion to the reduction of area 130. A level of flow 116 will thus be an indicator or proxy of area 130, and consequently an indicator of the degree of wear experienced by tire 106.

Referring now to FIG. 2, a meter 114 is disposed operably to sensor 104 to measure flow 116 and output a value 120 substantially proportional to flow 116. Meter 114 may be a galvanometer, a voltmeter, an ammeter, a light emitting diode, or a photon counter. In one embodiment, meter 114 measures flow 116 at discrete time intervals. In this embodiment, the time interval may be proportional to a speed of vehicle 102.

A transmitter 122 is disposed operably to meter 114 to transmit value 120 to a vehicle information system 124.

Transmitter 122 may be an RF transmitter. In one embodiment, a temperature sensor 104 is disposed operably to sensor 104.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While the invention has been described in detail above, the invention is not intended to be limited to the specific embodiments as described. It is evident that those skilled in the art may now make numerous uses and modifications of and departures from the specific embodiments described herein without departing from the inventive concepts.

While various embodiments of the present invention have been described above, they should be understood to have been presented by way of examples only, and not limitation. Thus, the breadth and scope of the present invention should not be limited by the above described embodiments.

Obviously, numerous modifications and variations of the present invention are possible in light of the above teachings. It is therefore to be understood that the invention may be practiced otherwise than as specifically described herein.

What is claimed is:

1. A tire monitor for a vehicle, comprising:
   a sensor disposed in said tire;
   a power supply connecting a first and second ends of said sensor, said power supply applying a predetermined effort across said first and second ends and causing an electrical flow through said sensor;
   a meter disposed operably to said sensor to measure said flow, which is caused by the power supply, and output a value substantially proportional to said flow; and
   a transmitter disposed operably to said meter to transmit said value to a vehicle information system;
   wherein said flow, which is caused by the power supply, is reduced by a damage to said tire.

2. The tire monitor for a vehicle of claim 1, wherein said sensor is selected from the group consisting of:
   a thermocouple,
   a conductor,
   a resistor,
   an inductor,
   a thermometer,
   an optical fiber, and
   a waveguide.

3. The tire monitor for a vehicle of claim 1, wherein said sensor is disposed circumferentially about an axis of rotation of said tire.

4. The tire monitor for a vehicle of claim 1, wherein said sensor is disposed in a sidewall of said tire.

5. The tire monitor for a vehicle of claim 1, wherein said power supply is selected from the group consisting of:
   a battery,
   an inductive pick-up, and
   a light source.

6. The tire monitor for a vehicle of claim 1, wherein said meter is selected from the group consisting of:
   a galvinometer,
   a voltmeter,
   an ammeter,
   a light emitting diode, and
   a photon counter.

7. The tire monitor for a vehicle of claim 1, wherein said meter measures said flow at discrete time intervals.

8. The tire monitor for a vehicle of claim 7, wherein the time interval is proportional to a speed of the vehicle.

9. The tire monitor for a vehicle of claim 1, wherein said transmitter is an RF transmitter.

10. The tire monitor for a vehicle of claim 1, comprising further a temperature sensor disposed operably to said sensor.

11. The tire monitor for a vehicle of claim 1, wherein said flow is proportional to a an area of a cross-section of said sensor; and
    wherein said area is inversely proportional to said damage.

12. The tire monitor for a vehicle of claim 1, wherein said effort is a voltage and said flow is a current.

13. The tire monitor for a vehicle of claim 1, wherein said flow is reduced when said sensor is pierced by an object.

14. The tire monitor for a vehicle of claim 1, wherein said damage is proportional to a tread wear.

15. A tire monitor for a vehicle, comprising:
    a sensor disposed in said tire;
    a power supply connecting a first and second ends of said sensor, said power supply applying a flow through said sensor and causing a variable effort across said first and second ends;
    a meter disposed operably to said sensor to measure said variable effort and output a value substantially proportional to said variable effort; and
    a transmitter disposed operably to said meter to transmit said value to a vehicle information system;
    wherein said variable effort is increased by a damage to said tire.

16. The tire monitor for a vehicle of claim 15, wherein said sensor is disposed circumferentially about an axis of rotation of said tire.

17. The tire monitor for a vehicle of claim 15, wherein said sensor is disposed in a sidewall of said tire.

18. The tire monitor for a vehicle of claim 15, wherein said transmitter is an RF transmitter.

19. The tire monitor for a vehicle of claim 15, comprising further a temperature sensor disposed operably to said sensor.

20. The tire monitor for a vehicle of claim 15, wherein said variable effort is inversely proportional to an area of a cross-section of said sensor; and
    wherein said area is proportional to said damage.

* * * * *